United States Patent
Borsboom

(10) Patent No.: US 9,951,803 B2
(45) Date of Patent: Apr. 24, 2018

(54) NOZZLE AND FASTENING ELEMENT FOR FASTENING A MATERIAL LAYER

(71) Applicant: SFS intec Holding AG, Heerbrugg (CH)

(72) Inventor: Lucas Borsboom, Roermond (NL)

(73) Assignee: SFS intec Holding AG, Heerbrugg (CH)

(*) Notice: Subject to any disclaimer, the term of this patent is extended or adjusted under 35 U.S.C. 154(b) by 194 days.

(21) Appl. No.: 14/771,368

(22) PCT Filed: Mar. 10, 2014

(86) PCT No.: PCT/EP2014/054573
§ 371 (c)(1),
(2) Date: Aug. 28, 2015

(87) PCT Pub. No.: WO2014/139946
PCT Pub. Date: Sep. 18, 2014

(65) Prior Publication Data
US 2016/0003277 A1 Jan. 7, 2016

(30) Foreign Application Priority Data
Mar. 13, 2013 (DE) .................. 10 2013 004 392

(51) Int. Cl.
*F16B 43/00* (2006.01)
*F16B 13/04* (2006.01)
(Continued)

(52) U.S. Cl.
CPC ............ *F16B 13/04* (2013.01); *E04B 1/7629* (2013.01); *E04D 3/3603* (2013.01);
(Continued)

(58) Field of Classification Search
CPC .......... F16B 34/00; F16B 35/06; F16B 43/00; E04D 5/145
(Continued)

(56) References Cited

U.S. PATENT DOCUMENTS

| 4,630,984 A | 12/1986 | Reinwall et al. |
| 4,726,164 A * | 2/1988 | Reinwall .................. E04D 3/36 411/511 |

(Continued)

FOREIGN PATENT DOCUMENTS

| DE | 3500084 | 8/1985 |
| DE | 3606321 | 9/1987 |

(Continued)

OTHER PUBLICATIONS

Duden: Deutsches Universalwoerterbuch, 7., uberarbeitete und erweiterte Auflage, Herausgegeben von der Dudenredaktion, Dudenverlag Mannheim, Zurich.

*Primary Examiner* — Flemming Saether
(74) *Attorney, Agent, or Firm* — Volpe and Koenig, P.C.

(57) ABSTRACT

The invention relates to a nozzle (10) for fastening a material layer to a substructure, comprising a plate (12) and a hollow shank (14), integrally formed thereon, for taking a fastening screw (24; 34), wherein a stepped bore (16) is provided in the hollow shank, wherein the stepped bore (16) comprises at least two steps (28; 38; 50) between at least three regions (18; 30; 36; 2), wherein the hollow shank (14) is formed so as to taper at least partially in a conical manner on an external surface, wherein the hollow shank (14) is provided with radially expandable elements, and wherein the expandable elements are formed as axial grooves (40) externally in that part of the hollow shank (14) that is formed in a conically tapering manner. The invention proposes that the grooves (10) are each provided at the groove base at least partially with a thin bottom (42) that is stretchable or breakable by the expansion. The present invention also relates to a fastening element comprising a nozzle (10) according to the invention and a fastening screw (24; 34).

10 Claims, 7 Drawing Sheets

(51) Int. Cl.
*E04D 3/36* (2006.01)
*E04B 1/76* (2006.01)
*E04D 5/14* (2006.01)

(52) U.S. Cl.
CPC ............ *F16B 13/045* (2013.01); *F16B 43/00* (2013.01); *E04D 5/145* (2013.01)

(58) Field of Classification Search
USPC ........................................ 411/533, 396, 480
See application file for complete search history.

(56) References Cited

U.S. PATENT DOCUMENTS

| | | | | |
|---|---|---|---|---|
| 4,881,861 A * | 11/1989 | Hewison | ............... | E04D 3/3603 411/383 |
| 4,909,691 A * | 3/1990 | Bogel | ................... | E04D 3/3603 405/259.1 |
| 5,607,272 A * | 3/1997 | Olvera | ...................... | B25C 1/18 411/368 |
| 6,308,483 B1 * | 10/2001 | Romine | ................ | E04D 3/3603 411/383 |
| 6,406,243 B1 * | 6/2002 | Kolodziej | ............. | E04B 1/7633 411/369 |
| 6,565,303 B1 * | 5/2003 | Riccitelli | ................ | E04D 3/3603 411/368 |
| 6,709,214 B1 * | 3/2004 | Angehrn | ............... | E04D 3/3603 411/533 |
| 8,763,332 B2 * | 7/2014 | Shadwell | ................ | E04D 5/145 411/531 |
| 2012/0017529 A1 | 1/2012 | Shadwell et al. | | |

FOREIGN PATENT DOCUMENTS

| | | |
|---|---|---|
| DE | 29618959 | 12/1996 |
| DE | 102010048537 | 4/2012 |
| EP | 0600284 | 6/1994 |
| WO | 0020703 | 4/2000 |

* cited by examiner

NOZZLE AND FASTENING ELEMENT FOR FASTENING A MATERIAL LAYER

BACKGROUND

The present invention relates to a nozzle for fastening a material layer to a sub-structure, comprising a plate and a hollow shaft integrally formed thereon for receiving a fastening screw, a stepped hole being provided in the hollow shaft, the stepped hole comprising at least two steps between at least three regions, the hollow shaft being formed so as to taper conically at least in part on an outer surface, the hollow shaft being provided with radially expandable elements and the expandable elements being formed as axial grooves on the outside in the conically tapering part of the hollow shaft.

The present invention also relates to a fastening element for fastening a material layer to a sub-structure, wherein the fastening element is in two parts and comprises the nozzle according to the invention and a fastening screw.

One problem, which is often encountered in conjunction with building insulation, consists in fixing a material layer, for example insulating material and roofing membranes, to a sub-structure. In order to make it as easy as possible to mount an insulating material and a roofing membrane and to prevent any damage to the insulating material and/or the roofing membrane during mounting, fastening elements are usually used which comprise a nozzle and a screw which is adapted to the nozzle. Fastening elements and nozzles of this type are known from DE 296 18 959 U1, EP 0 600 284 A1 and EP 1 117 882 B1, for example.

E 35 00 084 A1 describes a fastening element comprising a plate and a short, integrally formed shaft. The shaft, which is designed to receive a fastening screw, comprises a stepped hole comprising a shoulder, which acts as a stop for the fastening screw in the mounted stated, and lips comprising sloping upper surfaces. In this way, a stepped holed having two steps is produced. Furthermore, longitudinal slots in the lower region of the shaft are also described, by means of which movable lips are provided on the lower shaft end which can be spread apart in a resilient manner when the fastening screw penetrates the shaft.

DE 10 2010 048 537 A1 describes a nozzle comprising a plate and a hollow shaft integrally formed thereon for receiving a fastening screw, a stepped hole being arranged in the hollow shaft, which hole has a total of four different radii. Furthermore, a length compensation element in the region of the shaft is described.

US 2012/0017529 A1 describes a nozzle comprising a plate and a hollow shaft integrally formed thereon, in which a fastening screw is received during mounting in order to attach a water impermeable membrane 114 and insulation 112 to a substructure 116, as shown in FIG. 13 of the present application. Lips which can flexibly bend outwards and are separated from one another by grooves are arranged on the lower end of the shaft. Furthermore, projecting ribs are arranged inside the hollow shaft, which allow the nozzle to be used reliably together with fastening screws of different thicknesses.

DE 36 06 321 A1 describes an insulating-board dowel comprising a plate and a hollow shaft integrally formed thereon, which comprises radially projecting ribs on the inside and outside thereof, by means of which drilled-hole tolerances are compensated.

A drawback of some of the known fastening elements is in particular the need to use different screws which are adapted to the present sub-structure or to the weight of the insulating materials used. Therefore, a large number of different nozzles which are adapted to the screws and the insulating materials also have to be provided. Overall, a large number of different nozzles and fastening elements thus have to be produced and supplied in order for a sufficiently secure fastening to always be possible.

SUMMARY

The present invention makes it possible to simplify the production and supply of the nozzles and the fastening elements.

The problem addressed by the present invention is that of improving the stability of the universal nozzle independently of the fastening screw.

This problem is solved by one or more of the features of the invention.

Advantageous embodiments are provided below and in the claims.

The invention builds on the generic nozzle in that the grooves are each provided on the bottom thereof at least in part with a thin base which can be stretched or broken by the expansion. In particular when using a fastening screw which does not expand the narrowing portion, providing the base on the bottom of the grooves increases the stability of the universal nozzle at the end thereof which faces away from the plate, which end normally has to penetrate the material layer to be fastened, for example insulating material and roofing membranes. At the same time, despite the thin base on the bottom of the grooves, the deformation of the narrowing portion during expansion can be predetermined. The base on the bottom of the grooves is thin compared with the radial thickness of the adjoining, adjacent expandable elements. The base on the bottom of the grooves may for example be considered to be thin when the thickness thereof is less than a fifth of the thickness of the adjacent expandable elements. The thin base may furthermore have a thickness which remains constant over the groove width between two adjacent, adjoining expandable elements. When expanding the nozzle by means of the fastening screw, the base is either pulled apart, so that the thickness thereof decreases because the volume thereof remains the same, or is broken by the tensile forces applied because the resilience thereof is insufficient. The nozzle may, if required, that is to say depending on the material layer, for example insulating material or roofing membrane, or on the available sub-structure, be used together with different screws which are in particular of different sizes, that is to say of different diameters and/or different screw-head sizes. A single, universal nozzle can thus be used, and therefore there is no longer the need to produce and supply a large number of different nozzles. Each of the at least two regions may thus represent a centering/guidance for a fastening screw which can be used together with the nozzle and of which the diameter is equal to or greater than the diameter of the region. Irrespective thereof, each of the at least two steps may represent an axial stop for a screw head of a corresponding size.

It is provided that the hollow shaft is formed so as to taper conically at least in part on an outer surface. In this way, the nozzle can be caused to penetrate the material layer to be fastened in a particularly simple manner.

Furthermore, it is also provided that the hollow shaft is provided with radially expandable elements. The expandable elements promote the use of fastening screws of different sizes/thicknesses, that is to say fastening screws having a different diameter, in that controlled deformation of the universal nozzle is ensured when using a fastening screw having a diameter which is greater than the smallest diameter of the at least two regions.

It is also provided that the expandable elements are formed as axial grooves on the outside in the conically tapering part of the hollow shaft. By means of the axial grooves, the deformation of the universal nozzle can be particularly easily predetermined when using a fastening screw which expands the narrowing portion.

It may be provided that at least one of the at least three regions has a constant diameter. Owing to the diameter which remains constant over the region, improved guidance in the nozzle can be produced for fastening screws comprising corresponding threaded shafts of different thicknesses. In this case, a region could be conical; however, it could also have the at least three regions having different diameters which each remain constant.

Advantageously, it may be provided that the different diameters of the at least three regions which remain constant over the respective regions decrease starting from an end of the hollow shaft facing the plate. Owing to the diameter which decreases from region to region, different axial stops may be provided for different screws, which differ in particular in the size of the screw head which can be received, for a single universal nozzle. This makes it possible for the screws used to project out of the available sub-structure in a manner which is adapted in particular to the weight of the insulating material. Furthermore, guidance which is adapted to different diameters of the fastening screw may also be provided.

It may also be provided that at least one of the at least two steps is designed as an axial stop for the fastening screw. In this way, different defined end positions can be determined for different fastening screws which can be used together with the nozzle.

Furthermore, it may be provided that the material of which the nozzle is made has a lower strength than the fastening screw, and therefore the stepped hole can be expanded by the second fastening screw. In this way, it can be ensured that the fastening screw used is not damaged on the nozzle. Furthermore, the strength of the nozzle, which is lower than the fastening screw, can ensure the alternative use of fastening screws of different sizes together with the universal nozzle, since the hollow shaft can be prevented from breaking in the region of the stepped hole owing to the expandability.

Furthermore, it may be provided that the grooves are each open at the end thereof opposite the plate. This first makes it possible for the narrowing portion to deform during expansion and moreover makes it possible for the nozzle to be inserted into the insulating material, since, instead of a continuous ring, a plurality of small, that is to say "more pointed", circular arc segments perforate the insulating material used independently of one another when inserted.

Usefully, it may be provided that the hollow shaft is provided, at the end thereof opposite the plate, at least with two diametrically opposed axial grooves as expandable elements. This is the simplest symmetrical arrangement of at least two grooves by means of which the expansion of the narrowing portion can be predetermined. Alternatively, it is of course also possible to provide additional grooves, which may be arranged on the end of the nozzle facing away from the plate so as to be substantially evenly spaced. For example, instead of two, there may also be three, four, five or six grooves which are evenly arranged around the end of the nozzle facing away from the plate. The various grooves may be of different axial lengths, which for example may be adapted to the positioning of the at least two regions. For example, different axial grooves may end at the axial height of different axial steps.

The fastening element according to the invention comprises a nozzle according to the invention and a fastening screw which is or can be received thereby and can be anchored in the sub-structure.

Advantageously, it may be provided that the screw has a thread-free shaft portion directly below the head.

Furthermore, it may be provided that the thread-free shaft portion of the fastening screw can be received in one of the at least three regions without radial play.

Usefully, it may be provided that the fastening screw which has been inserted into the nozzle is held without play in the pre-mounted state by at least one of the at least three regions and/or axially abuts one of the at least two steps.

BRIEF DESCRIPTION OF THE DRAWINGS

The invention is explained by way of example on the basis of preferred embodiments, with reference to the accompanying drawings, in which.

DETAILED DESCRIPTION OF THE PREFERRED EMBODIMENTS

Figure 1:
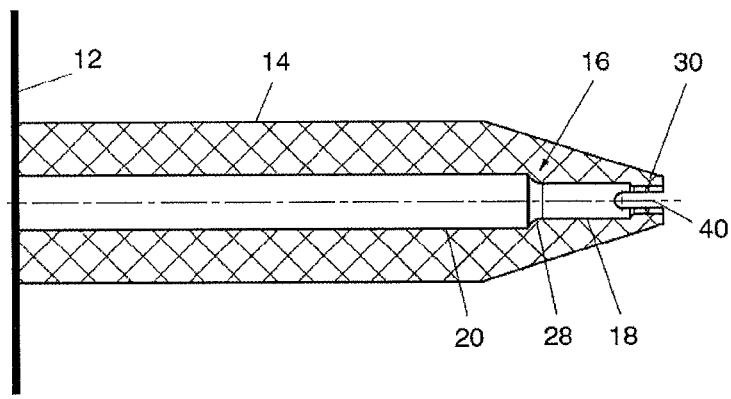
FIG. 1 is a sectional view through an embodiment of a nozzle.

In the drawings, identical reference numerals denote identical or similar parts.

FIG. 1 is a sectional view through an embodiment of a nozzle. The nozzle 10 shown in FIG. 1 comprises a hollow shaft 14 and a plate 12 which is integrally formed on the hollow shaft 14. The hollow shaft 14 is open at the end thereof facing the plate 12, so that, from this end of the hollow shaft 14, a fastening screw can be inserted through the plate 12 into the hollow shaft 14 as far as a step 28 of a stepped hole 16 which is arranged at the other end of the hollow shaft 14. The stepped hole 16 comprises a first region 18 and a second region 20, the first region 18 having a smaller diameter than the second region 20. The step 28 is arranged between the first region 18 and the second region 20, which step is formed as an axial stop for a head of a screw to be inserted. A narrowing portion 30 may also optionally be attached to the first region 18, which portion may represent an additional region. The narrowing portion 30 is for example attached to the first region 18 at the end of the hollow shaft 14 which faces away from the plate 12. Grooves 40 may be arranged at the level of the narrowing portion 30 which allow the narrowing portion 30 to be expanded in a controlled manner. The grooves 40 may optionally also extend over additional regions and thus optionally also allow the nozzle 10 to be expanded in a controlled manner. The entire nozzle 10 may in particular be made of plastics material, in order for example to ensure the desired thermal insulation of the fastening screws and to produce a strength that is lower than that of the fastening screws and a greater deformability. The first region 18 thus provides screw centering, which in the optional narrowing portion 30 can be "reduced" again. The second region 20 may allow the head of an adapted fastening screw to freely rotate.

Figure 2A:
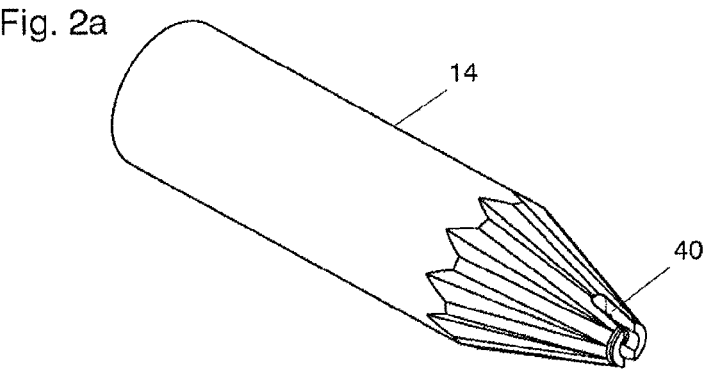
FIG. 2a is a three-dimensional external view of a hollow shaft.

FIG. 2a is a three-dimensional external view of a hollow shaft. The hollow shaft 14 shown in FIG. 2a shows in particular grooves 40 on the conically tapering end of the hollow shaft 14, which is arranged on the end of the hollow shaft 14 facing away from the plate 12.

Figure 2B:
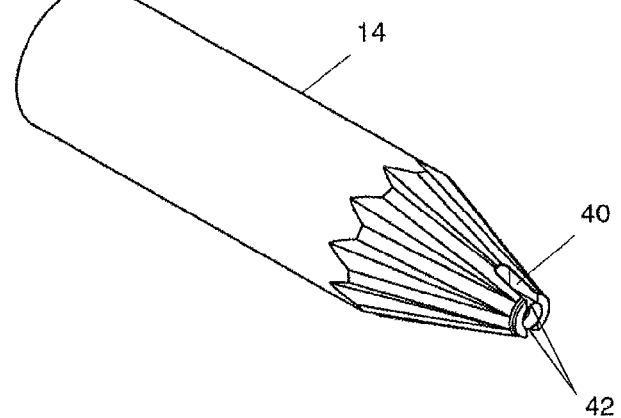
FIG. 2b is a three-dimensional external view of a further hollow shaft.

FIG. 2b is a three-dimensional external view of an additional hollow shaft. The hollow shaft 14 shown in FIG. 2b differs from the hollow shaft 14 shown in FIG. 2a in particular by thin bases 42 which are arranged in the grooves 40 and can be stretched or broken during expansion of the narrowing portion.

Figure 3:
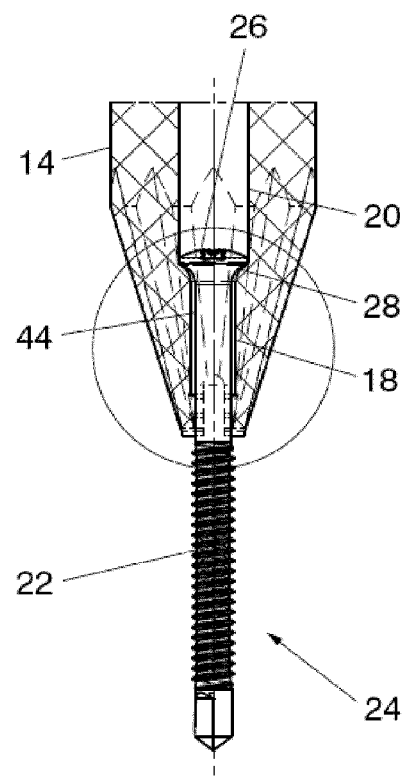
FIG. 3 is a sectional view of a hollow shaft comprising a pre-mounted fastening screw.
Figure 4:
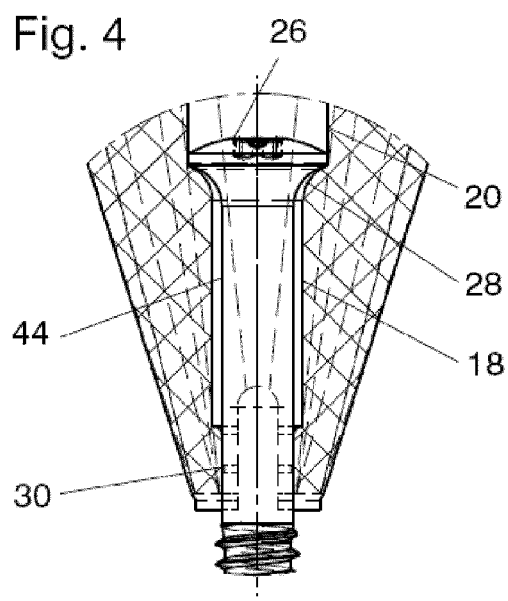
FIG. 4 is a detailed view of the sectional view from FIG. 3.
Figure 13:
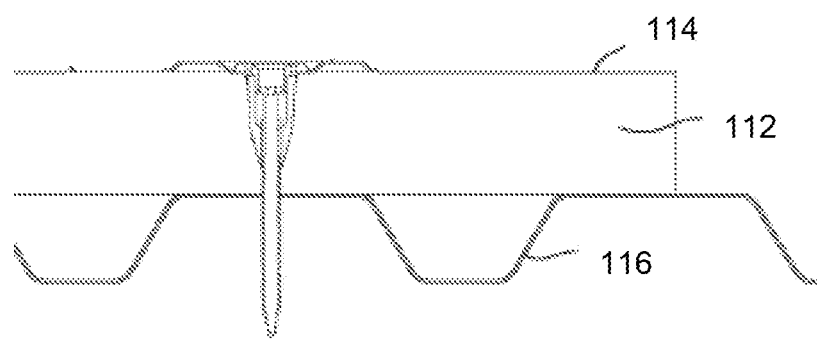
FIG. 13 is a cross-sectional view of a prior art arrangement.

FIG. 3 is a sectional view of a hollow shaft comprising a pre-mounted fastening screw. A first fastening screw 24 shown in FIG. 3 comprises a head 26 which abuts the step 28 between the first region 18 and the second region 20 in the axial direction. The first fastening screw 24 also comprises a first threaded shaft 22 and an optional, thread-free shaft portion 44 between the first threaded shaft 22 and the head 26. The cooperation between the first fastening screw 24 and the hollow shaft 14 is shown in FIG. 4. The first fastening screw 24 and nozzle 10 can be used, for example, for fastening insulating material and a roofing membrane to a substructure, in a similar manner to the prior art as shown in FIG. 13.

FIG. 4 is a detailed view of the sectional view from FIG. 3. As can be seen from FIG. 4, the diameter of the thread-free shaft portion 44 corresponds to the diameter of the narrowing portion 30, so that the first fastening screw 24 is guided by the optional narrowing portion 30 in a form-fitting manner. The portion of the first region 18 which does not belong to the narrowing portion 30 accordingly has a greater diameter than the optional, thread-free shaft portion 44, so there is play here. As can be seen from FIG. 3 and to some extent from FIG. 4, the first threaded shaft 22 of the first fastening screw 24 may have a greater diameter than the first optional, thread-free shaft portion 44, so that the first fastening screw 24 can be retained so as not to be lost in the position shown in FIG. 3 which is relative to the hollow shaft 14. This is also possible without the optional, first, thread-free shaft portion 44. The first threaded shaft 22 may, when the first fastening screw 24 is pre-mounted on the nozzle 10, for example resiliently deform the narrowing portion 30 in order to ensure that the first fastening screw 24 is fastened so as not to be lost.

Figure 5:
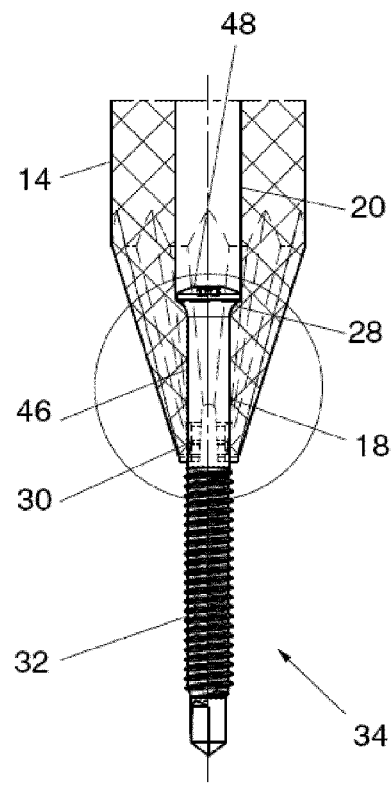
FIG. 5 is a further sectional view of a hollow shaft comprising a pre-mounted fastening screw.

FIG. 5 is a further sectional view of a hollow shaft comprising a pre-mounted fastening screw. The hollow shaft 14 shown in FIG. 5 substantially corresponds to the hollow shaft 14 which is already known from FIG. 3. Instead of the first fastening screw 24, however, a second fastening screw 34 is pre-mounted which in particular has a greater diameter than the first fastening screw 24. The second fastening screw 34 comprises, similarly to the first fastening screw 24, a head 48 and a second threaded shaft 32, and an optional, thread-free shaft portion 46 arranged between the head 48 and a second threaded shaft 32. The region between the hollow shaft 14 and the second fastening screw 34 is enlarged in FIG. 6.

Figure 6:
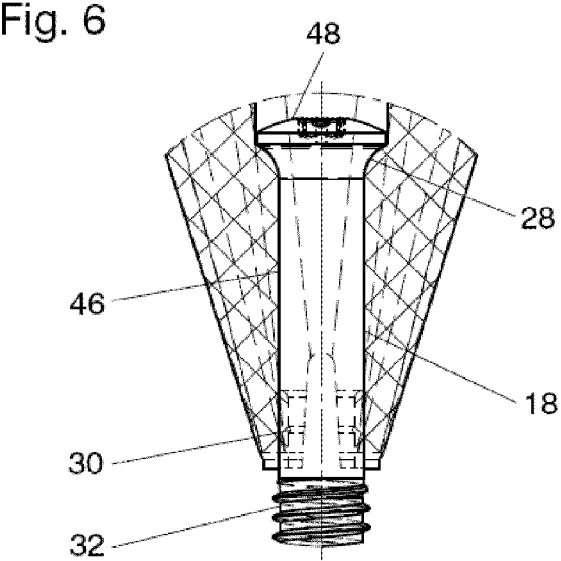
FIG. 6 is a detailed view of the sectional view from FIG. 5.

FIG. 6 is a detailed view of the sectional view from FIG. 5. As can be seen from FIG. 6, the second threaded shaft 32 also has a greater diameter than the thread-free shaft portion 46. Accordingly, the second fastening screw 34 is also, similarly to the first fastening screw 24, retained in the hollow shaft 14 on the optional, thread-free shaft portion 46 so as not to be lost. This is also possible without the optional, thread-free shaft portion 46. Owing to the greater diameter of the second fastening screw 34, the narrowing portion 30 is, however, permanently expanded by the second fastening screw 34 during pre-mounting, so that the second fastening screw 34 is retained in the narrowing portion 30 in a frictionally connected manner. Furthermore, there is also no play between the thread-free shaft portion 46 and the remainder of the first region 18. There may be form-fitting guidance without play in this case.

Figure 7:
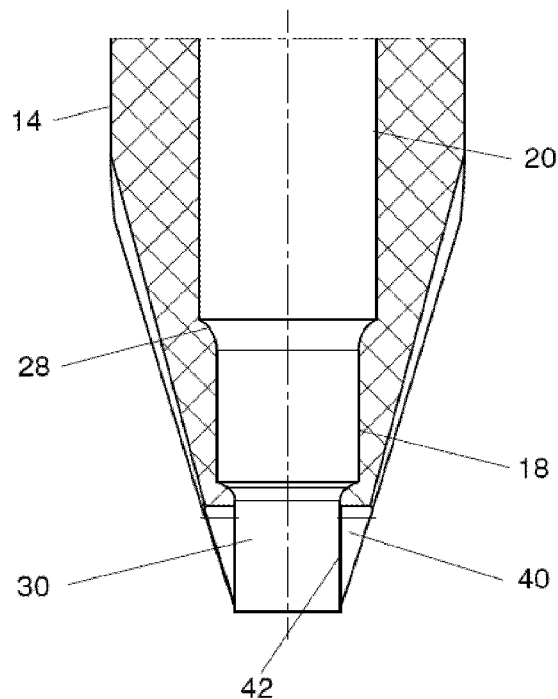
FIG. 7 is a sectional view of a first embodiment of a hollow shaft.

FIG. 7 is a sectional view of a first embodiment of a hollow shaft. FIG. 7 shows in particular the end of the hollow shaft 14 facing away from the plate 12, on which end the grooves 40 having the bases 42 are arranged in the narrowing region 30. The step 28 arranged between the first region 18 and the second region 20 can also be clearly seen, and is designed as an axial stop for heads of the fastening screws in the first embodiment shown in FIG. 7 and forms a continuous transition between the first region 18 and the second region 20. The sectional plane in FIG. 7 is rotated by 90° about the longitudinal axis compared with the view of the hollow shaft 14 which is already known from FIG. 1.

Figure 8:
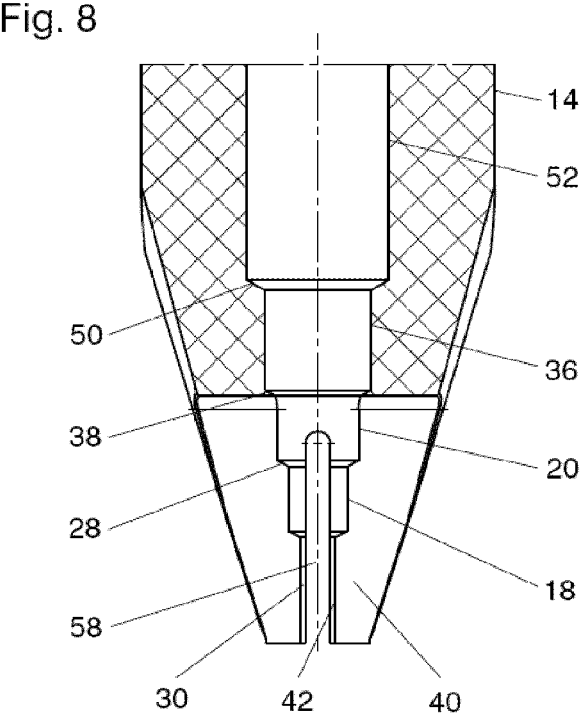
FIG. 8 is a sectional view of a second embodiment of a hollow shaft.

FIG. 8 is a sectional view of a second embodiment of a hollow shaft. The second embodiment shown in FIG. 8 differs from the first embodiment which is already known from FIG. 7 in particular by a third region 36 which is attached to the second region 20 on the side of the second region 20 which faces away from the first region 18. An additional step 38 is provided between the second region 20 and the third region 36. The third region 36 has a greater diameter than the second region 20. The additional step 38 may, just like the step 28, be designed as an axial stop. In this way, different screw heads, that is to say screw heads having different diameters, can be used together with the universal nozzle. Owing to the different axial positioning of the step 28 and the additional step 38, the fastening screws can be screwed into the nozzle to different extents, so that ends of the fastening screws used which project out of the substructure penetrate the fastened material layer, for example insulating material or roofing membrane, to different extents. In this way, an adaptation to the weight of the fastened material layer can take place. If necessary, additional regions having different diameters can be provided in the hollow shaft 14. For example, on the side of the third region 36 which faces away from the second region 20, an additional region 52 can be provided which may have a diameter which is yet larger than the third region 36. Between the third region 36 and the additional region 52, an additional step 50 may be provided which may also be formed as an axial stop. In addition to the groove 40, an additional groove 58, rotated by 90°, can be seen in the sectional view. The additional groove 58 extends in the axial direction beyond the narrowing portion 30 and the first region 18 as far as the second region 20, in order to allow the nozzle to be expanded in a controlled manner when using a "thick" screw, that is to say a fastening screw having a shaft diameter that is greater than the first region 18.

Figure 9:
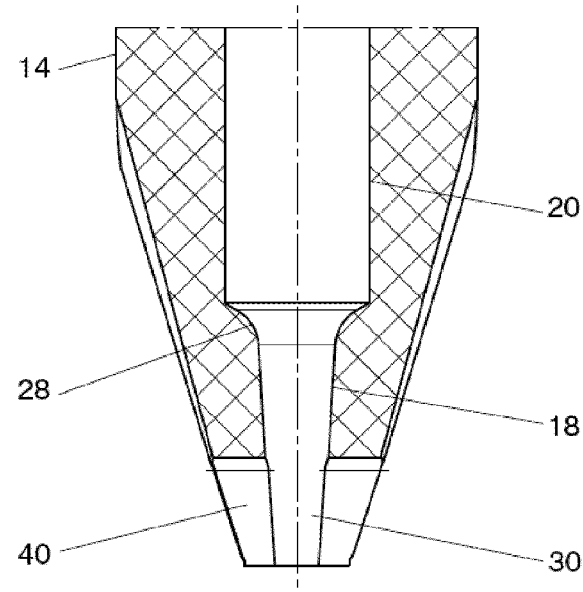
FIG. 9 is a sectional view of a third embodiment of a hollow shaft.

FIG. 9 is a sectional view of a third embodiment of a hollow shaft. The third embodiment of the hollow shaft 14 shown in FIG. 9 differs from the hollow shaft 14 known from FIG. 7 in particular by the conical tapering of the first region 18, which may also have, outside the narrowing portion 30, a diameter which decreases starting from the second region 20 and the step 28.

Figure 10:
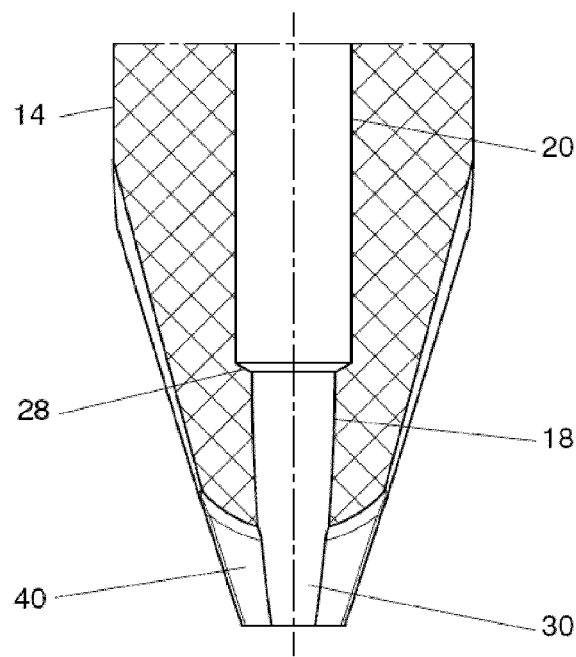
FIG. 10 is a sectional view of a fourth embodiment of a hollow shaft.

FIG. 10 is a sectional view of a fourth embodiment of a hollow shaft. The fourth embodiment shown in FIG. 10 differs from the third embodiment known from FIG. 9 by a particular configuration of the grooves 40 in the region of the narrowing portion 30. In the fourth embodiment shown in FIG. 10, the grooves 40 are raised further towards the plate 12 on the outside of the hollow shaft 14, so that a particularly controlled expansion of the tip of the hollow shaft 14 is possible when a correspondingly dimensioned fastening screw is pre-mounted.

Figure 11:
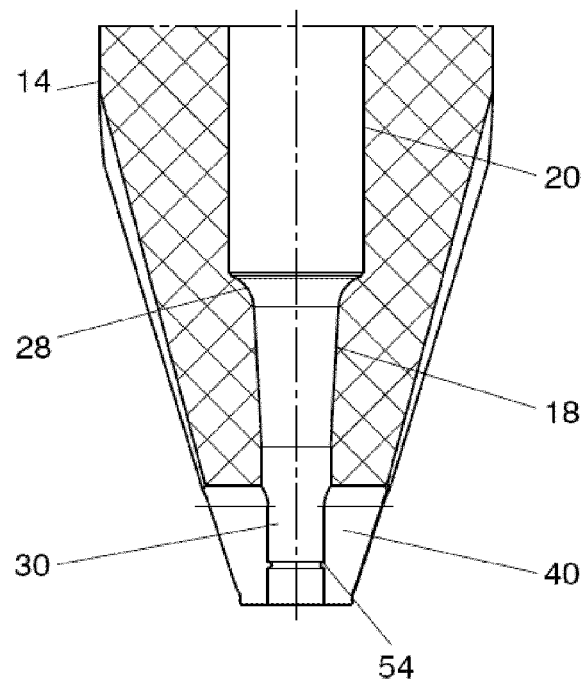
FIG. 11 is a sectional view of a fifth embodiment of a hollow shaft.

FIG. 11 is a sectional view of a fifth embodiment of a hollow shaft. The fifth embodiment shown in FIG. 11 comprises an indentation 54 in the region of the narrowing portion 30, which indentation can serve to additionally fix a pre-mounted screw in a frictionally connected manner. In the fifth embodiment shown in FIG. 11, the grooves 40 are extended beyond the narrowing region 30 into the rest of the first region 18, so that the expansion of the hollow cylinder by a correspondingly dimensioned fastening screw is particularly easy.

Figure 12:
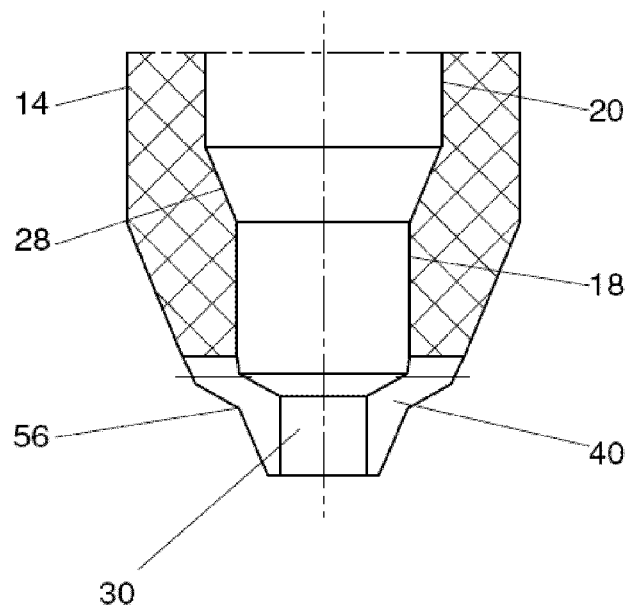
FIG. 12 is a sectional view of a sixth embodiment of a hollow shaft.

FIG. 12 is a sectional view of a sixth embodiment of a hollow shaft 14. In the sixth embodiment shown in FIG. 12, too, the end of the hollow shaft 14 facing away from the plate 12 is designed in a particular manner. Similarly to the fifth embodiment which is already known from FIG. 11, in the sixth embodiment too, the transition between the narrowing portion 30 and the non-narrowed portion of the first region 18 is arranged below the grooves 40. Furthermore, on the outside of the hollow shaft 14 in the region of the narrowing portion 30, an edge 56 is additionally provided which makes it possible to expand the tip of the hollow shaft 14 in a particularly defined manner when a correspondingly dimensioned fastening screw is pre-mounted.

The features of the invention which are disclosed in the above description, in the drawings and in the claims may be essential to carrying out the invention both in isolation and in any combination thereof.

LIST OF REFERENCE NUMERALS 10 nozzle
12 plate
14 hollow shaft
16 stepped hole
18 first region
20 second region
22 first threaded shaft
24 first fastening screw
26 head
28 step
30 narrowing portion
32 second threaded shaft
34 second fastening screw
36 third region
38 additional step
40 groove
42 base
44 thread-free shaft portion
46 thread-free shaft portion
48 head
50 additional step
52 additional region
54 indentation
56 edge
58 additional groove

The invention claimed is:

1. A nozzle (10) for fastening a material layer to a sub-structure, comprising a plate (12) and a hollow shaft (14) integrally formed thereon for receiving a fastening screw (24; 34), a stepped hole (16) located in the hollow shaft, the stepped hole (16) comprising at least two steps (28; 38; 50) between at least three regions (18; 30; 36; 52), each of the at least two steps forming an axial stop for a screw head of a corresponding size, the hollow shaft (14) being formed so as to taper conically at least in part on an outer surface, the hollow shaft (14) being provided with radially expandable elements and the expandable elements being formed by portions of the hollow shaft (14) that are separated from one another by axial grooves (40) on an outside in the conically tapering part of the hollow shaft (14), a thin base (42) formed at least in part along a bottom of each of the grooves (40), the thin base (42) being sized to be stretched or broken by expansion of the expandable elements.

2. The nozzle (10) according to claim 1, wherein the at least three regions (18; 30; 36; 52) have different diameters which each remain constant.

3. The nozzle (10) according to claim 2, wherein the different diameters of the at least three regions (18; 30; 36; 52) which remain constant over the respective regions decrease starting from an end of the hollow shaft (14) facing the plate (12).

4. The nozzle (10) according to claim 1, wherein the grooves (40) are each open at the end thereof opposite the plate (12).

5. The nozzle (10) according to claim 1, wherein the hollow shaft (14) is provided, at an end thereof opposite the plate (12), at least with two diametrically opposed axial grooves (40) as expandable elements.

6. A fastening element for fastening a material layer to a sub-structure, wherein the fastening element is in two parts and comprises a nozzle (10) according to claim 1, and a fastening screw (24; 34) which is received by said nozzle and is installable in the sub-structure.

7. The fastening element according to claim 6, wherein the screw has a thread-free shaft portion (44, 46) directly below the head (26, 48).

8. The fastening element according to claim 7, wherein the thread-free shaft portion (44, 46) of the fastening screw (24; 34) is received in at least one of the at least three regions (18; 30; 36; 52) without radial play.

9. The fastening element according to claim 6, wherein the fastening screw (24; 34) which has been inserted into the nozzle (10) is held without play in a pre-mounted state by one of the at least three regions (18; 30; 36; 52) or axially abuts one of the at least two steps (28; 38; 50).

10. The fastening element according to claim 6, wherein a material of which the nozzle (10) is made has a lower strength than the fastening screw (24; 34), and therefore the stepped hole (16) is expandable by the fastening screw (24; 34).

\* \* \* \* \*